US009873389B2

(12) United States Patent
Kato et al.

(10) Patent No.: US 9,873,389 B2
(45) Date of Patent: Jan. 23, 2018

(54) VEHICLE CUSHION COMPONENT

(71) Applicants: DAIWA KASEI INDUSTRY CO., LTD., Aichi (JP); HAYASHI TELEMPU CORPORATION, Aichi (JP)

(72) Inventors: Makoto Kato, Aichi (JP); Takaaki Yamazaki, Aichi (JP); Atsutoshi Kaji, Aichi (JP); Naoki Yamazaki, Aichi (JP)

(73) Assignees: DAIWA KASEI INDUSTRY CO., LTD., Aichi (JP); HAYASHI TELEMPU CORPORATION, Aichi (JP)

( * ) Notice: Subject to any disclaimer, the term of this patent is extended or adjusted under 35 U.S.C. 154(b) by 0 days.

(21) Appl. No.: 15/202,263

(22) Filed: Jul. 5, 2016

(65) Prior Publication Data

US 2017/0008463 A1    Jan. 12, 2017

(30) Foreign Application Priority Data

Jul. 10, 2015 (JP) ................................. 2015-138729
Jul. 4, 2016 (JP) ................................. 2016-132190

(51) Int. Cl.
*B60R 13/02* (2006.01)
*B60R 13/08* (2006.01)

(52) U.S. Cl.
CPC ...... *B60R 13/0243* (2013.01); *B60R 13/0206* (2013.01); *B60R 13/08* (2013.01)

(58) Field of Classification Search
CPC ............... B60R 21/04; B60R 21/0428; B60R 2021/0414; B60R 2021/0435; B60R 2021/0442; B60R 13/025

USPC ... 296/187.05, 146.7, 203.02, 68.1, 70, 192, 296/1.08, 214, 37.12
See application file for complete search history.

(56) References Cited

U.S. PATENT DOCUMENTS

| 7,901,002 B2 * | 3/2011 | Mashimo | B60N 2/5825 297/218.3 |
| 8,056,965 B2 * | 11/2011 | Rosemann | E05F 5/022 16/86 A |
| 8,407,857 B2 * | 4/2013 | Sugiyama | F16F 1/371 16/86 R |
| 2005/0095084 A1 * | 5/2005 | Hansen | F16B 21/086 411/508 |
| 2011/0167590 A1 * | 7/2011 | Ukai | E05F 5/022 16/85 |
| 2012/0246896 A1 * | 10/2012 | Kaji | E05F 5/022 24/682.1 |

FOREIGN PATENT DOCUMENTS

JP    H08-238931    9/1996

* cited by examiner

*Primary Examiner* — D Glenn Dayoan
*Assistant Examiner* — Sunsurraye Westbrook
(74) *Attorney, Agent, or Firm* — McClure, Qualey & Rodack, LLP

(57) ABSTRACT

Provided is a vehicle cushion component that can suppress generation of unusual sound due to contact between a boss included in an interior panel of a vehicle and an opposing member, and facilitate the mounting operation to the boss. A vehicle cushion component is disposed as an elastic component assembled to a distal end of a projecting portion of an interior panel (interior component).

5 Claims, 13 Drawing Sheets

IX-IX Cross-Section

X-X Cross-Section

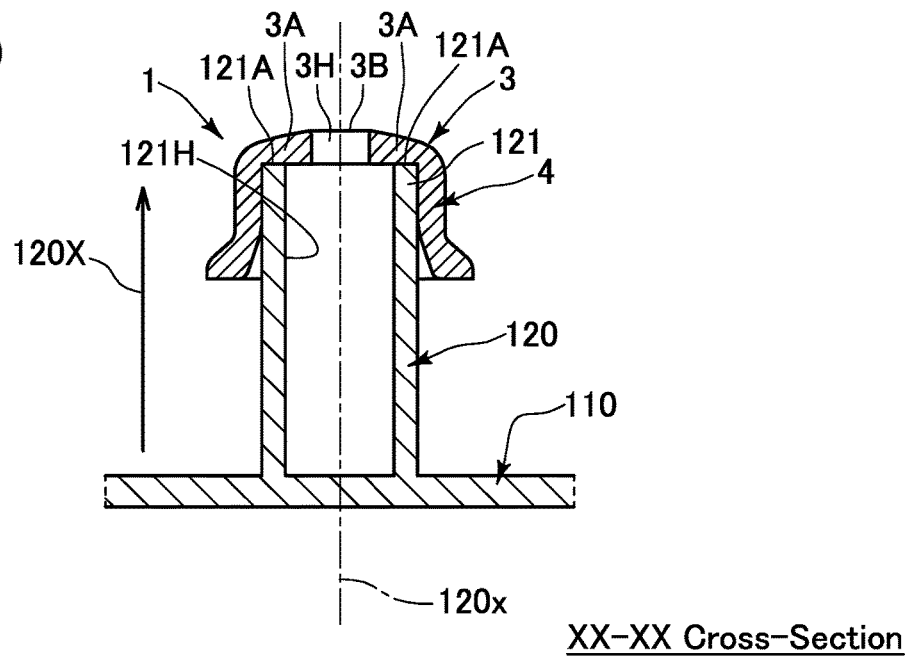
FIG.20 XX-XX Cross-Section
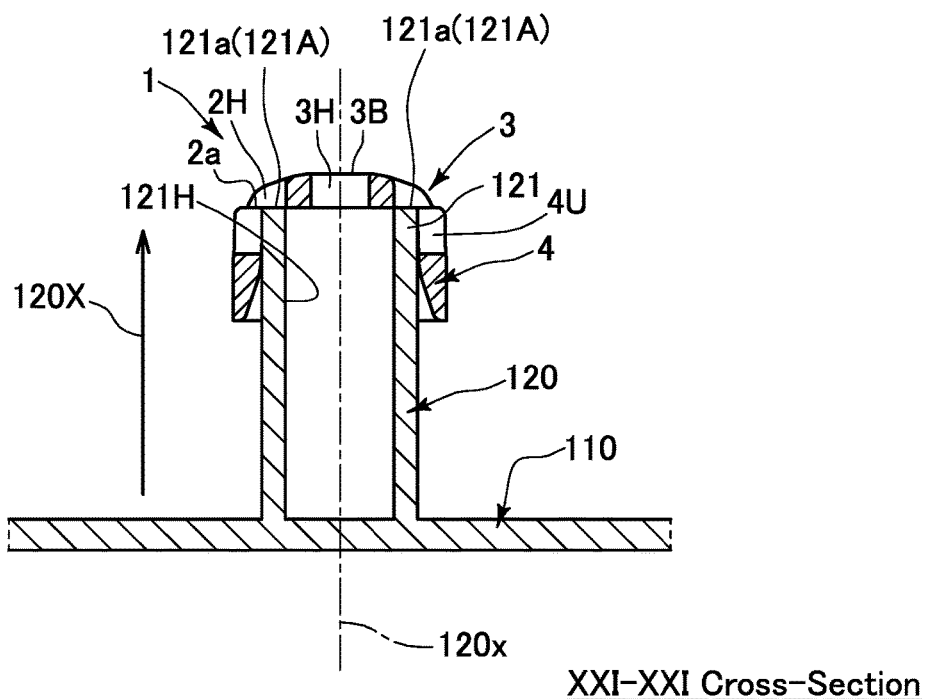
FIG.21 XXI-XXI Cross-Section

VEHICLE CUSHION COMPONENT

RELATED APPLICATIONS

This application claims the priority of Japanese Patent Application No. 2015-138729 filed on Jul. 10, 2015 and 2016-132190 filed on Jul. 4, 2016. The disclosure of the prior applications are hereby incorporated herein in their entireties by reference.

BACKGROUND OF THE INVENTION

Field of the Invention

This invention relates to a vehicle cushion component.

Background Art

For example, a vehicle door is provided with a door trim as a liner covering the cabin interior side thereof. The door trim is disposed so as to further cover the cabin interior side of an opposing member (e.g., an inner panel) provided on the cabin interior side of the door, and forms a space with a certain thickness between the opposing member and itself (see the Patent Document 1). However, the presence of this space poses the problem that the door trim may be dented and deformed when a knee of the driver in the cabin is pressed thereagainst. Accordingly, the door trim is provided with a boss (projecting portion) projecting toward the opposing member side and having a distal end coming into contact with the opposing member, thereby preventing the door trim from being dented.

PRIOR ART DOCUMENT

Patent Document

[Patent Document 1] Japanese Laid-Open Patent Publication No. H8-238931

SUMMARY OF THE INVENTION

Problems to be Solved by the Invention

However, due to traveling vibrations generated while the vehicle is traveling, the distal end of the boss (projecting portion) and the opposing member may repeatedly come into contact with and move away from each other, thus generating unusual sound.

An object of this invention is to provide a vehicle cushion component that can suppress generation of unusual sound due to contact between the boss included in the interior component of the vehicle and the opposing member, and facilitate the mounting operation to the boss.

Means for Solving Problems and Effects of the Invention

In order to solve the aforementioned problem, a vehicle cushion component according to this invention is disposed as an elastic component assembled to a distal end of a projecting portion formed so as to project from an interior component covering a cabin interior side of a vehicle, toward an opposing member disposed opposing the interior component on a vehicle exterior side thereof so as to maintain a space between the interior component and the opposing member, the vehicle cushion component including:

an opening for exposing a part of a projecting distal end surface of the projecting portion when the vehicle cushion component is assembled to the projecting portion to a predetermined position; and a positioning surface that constitutes a part of an opening outer peripheral portion surrounding the opening and is adjacent to the projecting distal end surface so as to be coplanar therewith.

Note that the interior component of this invention may be any component so long as it is a plate-like (panel-like) component (panel-like component) that is disposed so as to be exposed to a cabin interior during opening or closing of the door, and the opposing member disposed opposing the interior component on the vehicle exterior side thereof with a space therebetween is provided. For example, aside from the above-described door trim, the interior component may be a scuff plate, apackagetray, apillar garnish, a back door garnish, a deck side trim, or the like. The opposing member of this invention may be any plate-like member that is disposed opposing the interior component on the vehicle exterior side thereof with a space therebetween.

With the aforementioned configuration according to this invention, a cap-like elastic body is mounted as a cushion component to a distal end of the projecting portion (e.g., boss) projecting from an interior component such as a door trim. Accordingly, the elastic body is interposed between the end of the projecting portion and the opposing member as the cushion component, thus making it possible to prevent generation of unusual sound.

However, in the case of mounting a bottomed tubular cap to the distal end of the projecting portion of the interior component, it is not possible to check how far the projecting portion is inserted to the cushion component of this invention, so that it is difficult to determine whether the insertion is insufficient. To solve this problem, the vehicle cushion component of this invention includes an opening for exposing the distal end surface of the projecting portion of the interior component, and the insertion state can be checked from the opening. Furthermore, the vehicle cushion component of this invention includes, at a part of an opening outer peripheral portion surrounding the opening, a portion that becomes flush with the distal end surface of the projecting portion of the interior component when the vehicle cushion component is normally assembled to the distal end of the projecting portion. Accordingly, it is possible to visually check whether the insertion state is normal. Since the portion that becomes flush with the distal end surface of the projecting portion is adjacent to the distal end surface of the projecting portion, the visual determination of whether the insertion state is normal can be easily performed.

The vehicle cushion component according to this invention may have a cap shape in which a contact portion and a tubular outer peripheral portion are integrated with each other. The contact portion is formed so as to cover projecting distal end side of the projecting portion and serves as a portion coming into contact with the opposing member when the vehicle cushion component is assembled to the projecting portion with a tubular shape of the interior component to a predetermined position. The tubular outer peripheral portion surrounds an outer periphery of the projecting distal end side of the projecting portion. In this case, the above-described opening can be provided in the contact portion. When the projecting portion of the interior component has a tubular shape, the vehicle cushion component may have a bottomed tubular cap shape in order to be mounted so as to cover the distal end portion. However, during assembly, the cap-shaped vehicle cushion component may be subjected to a pressure by the air inside in a direction opposite to the assembling direction, which impede the assembly and makes it impossible to assemble the vehicle cushion component to a predetermined position. Since the vehicle cushion component according to this invention includes the opening at the contact portion covering the distal end of the tubular projecting portion of the interior component, the vehicle cushion component allows the air inside to escape during assembly, and can be assembled to a predetermined position.

In the vehicle cushion component according to this invention, the contact portion may be formed of a plurality of top extending portions that extend from a plurality of circumferential locations on an annular end surface of the tubular outer peripheral portion that surrounds the outer peripheral surface of the projecting portion, toward a central portion of the distal end opening of the tubular projecting portion so as pass over the distal end opening, and are connected with each other at the central portion, and each of the top extending portions may be formed to have a curved shape so as to be located further away from the projecting portion opening of the interior component (i.e., the distal end opening of the projecting portion) toward the central portion. With this configuration, the contact portion of the vehicle cushion component has a dorm shape so as to be located further away from the projecting portion opening of the interior component toward the central portion. Accordingly, the contact portion can smoothly come into contact with the opposing member at the central portion of the dorm shape, and the central portion has a shape that can easily undergo elastic deformation so as to come closer to the projecting portion opening of the interior component, thus making is possible to reliably absorb vibrations and the like and contribute to prevention of generation of unusual sound.

The vehicle cushion component according to this invention may be configured to have a U-shape in which a contact portion and opposing portions are integrated with each other. The contact portion covers a distal end side of the projecting portion with a plate shape of the interior component and comes into contact with the opposing member. The opposing portions sandwich both front and back principal surfaces at the distal end. The opening may be formed so as to cut out the contact portion. In this case, whether the distal end surface of the plate-like projecting portion of the interior component and the part of the opening outer peripheral portion surrounding the opening for exposing the distal end surface are flush with each other can be visually checked from the opening.

BRIEF DESCRIPTION OF THE DRAWINGS

FIG. 20 is a cross-sectional view taken along a line XX-XX in FIG. 19;

FIG. 21 is a cross-sectional view taken along a line XXI-XXI in FIG. 19;

DESCRIPTION OF THE EMBODIMENTS

Figure 1:
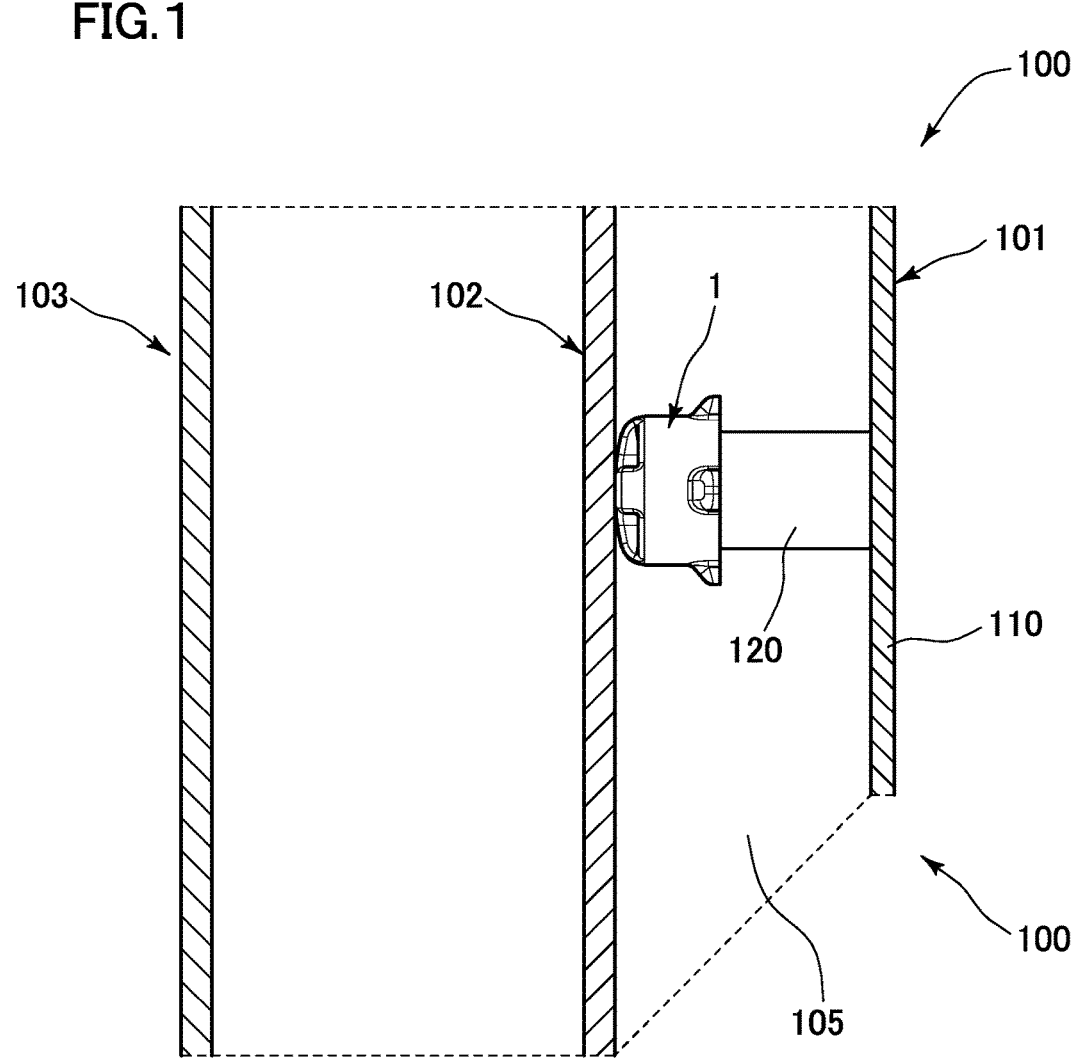
FIG. 1 is a cross-sectional view of an example of a vehicle door structure in which a vehicle cushion component according to this invention is disposed.

Embodiments of this invention will be described below with reference to the drawings.

A vehicle cushion component 1 of this invention is a component that is disposed as an elastic component assembled to a distal end of a projecting portion 120 formed so as to project from an interior component 101 covering a cabin interior side of a vehicle, toward an opposing member 102 disposed opposing the interior component 101 on a vehicle exterior side thereof so as to maintain a space 105 between the interior component 101 and the opposing member 102.

The interior component 101 in this embodiment is an interior panel 101 covering the cabin interior side of a vehicle door 100, and is a door trim 101 in this embodiment. The opposing member 102 may be any member that is disposed opposing the interior component 101, and is a door inner panel 102 in this embodiment. As shown in FIG. 1, for example, the vehicle door 100 is provided with a door outer panel 103 on the vehicle exterior side thereof, and the door inner panel 102 on the cabin interior side thereof. The door trim 101 is further provided on the cabin interior side of the door inner panel 102. In use, the vehicle cushion component 1 is mounted to a projecting portion 120 formed so as to project from the door trim 101. As the material for the door inner panel 102 and the door outer panel 103, iron, aluminum, CFRP (carbon-fiber-reinforced plastic), or the like can be used. As the material for the door trim 101, polypropylene or the like can be used. Note that other materials may be used for these components.

As shown in FIG. 1, the vehicle cushion component 1 is an elastic component that is assembled to a distal end 121 of the projecting portion 120 formed so as to project from the door trim 101 covering the cabin interior side of the vehicle door 100 toward an opposing member (in this example, the inner panel) 102 disposed opposing the door trim 101 on the vehicle exterior side thereof so as to maintain a space 105 between the door trim 101 and the opposing member 102. As used herein, the elastic component refers to an object that is softer (i.e., has a lower Young's modulus) than an object to which the vehicle cushion component 1 is mounted. The vehicle cushion component 1, which is an elastic component, is disposed in the vehicle door 100 between the projecting portion 120 of the door trim 101 and the opposing member 102 so as to come into contact with both the projecting portion 120 and the opposing member 102, and absorbs vibrations of both of the components, thus suppressing generation of unusual sound. The vehicle cushion component 1 of this embodiment is an injection-molded article made of an elastomer. Note that an elastic material other than the elastomer may be used as the material for the vehicle cushion component 1.

Figure 2:
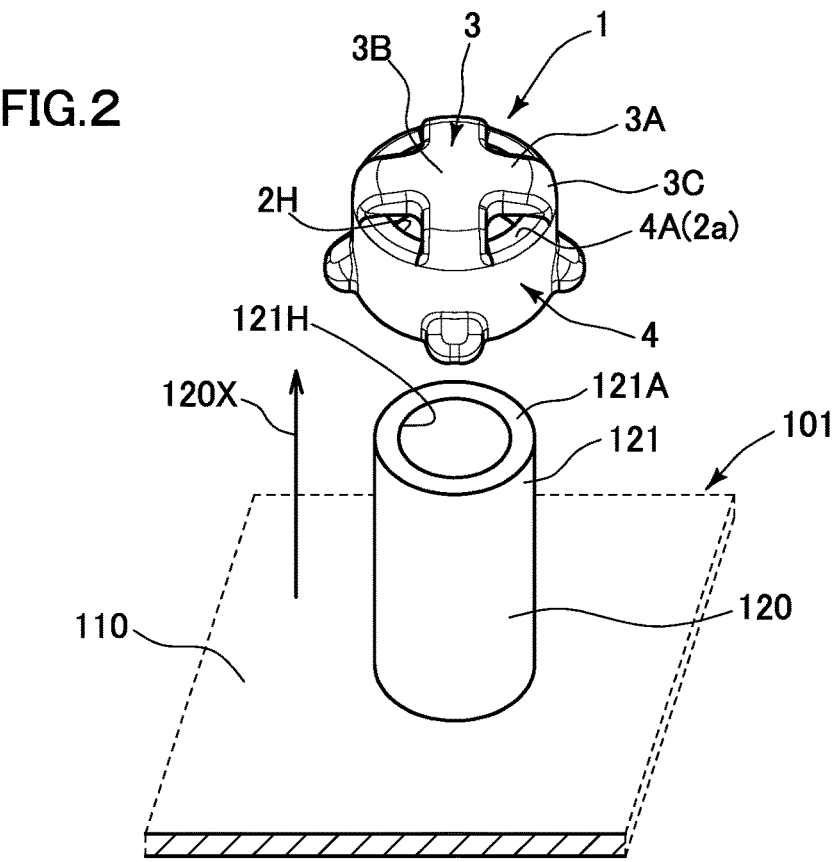
FIG. 2 is a perspective view of a first embodiment of the vehicle cushion component shown in FIG. 1, showing a state before the vehicle cushion component is mounted.
Figure 8:
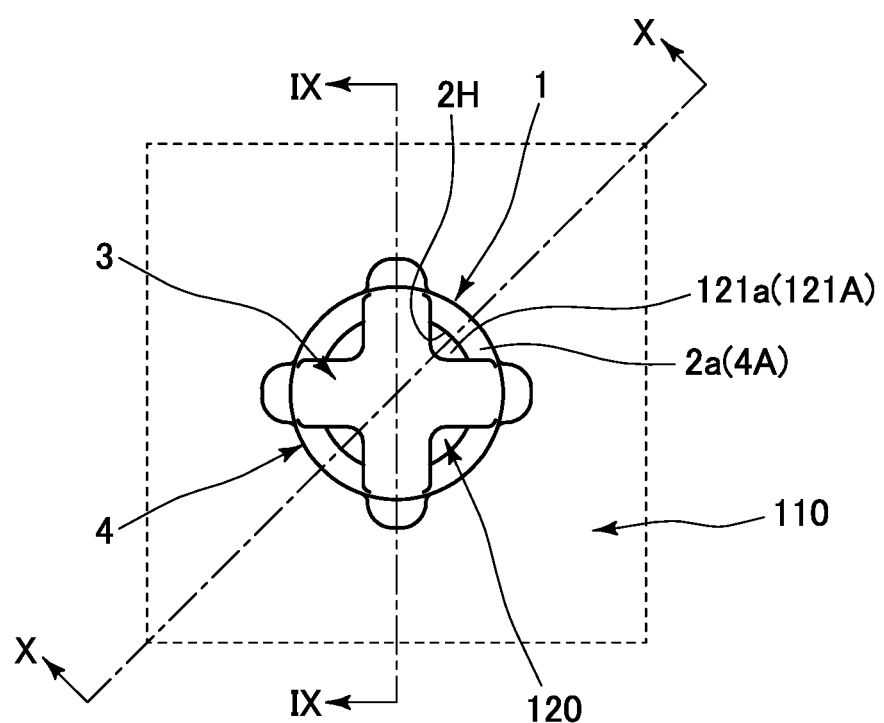
FIG. 8 is a plan view of FIG. 3.
Figure 9:
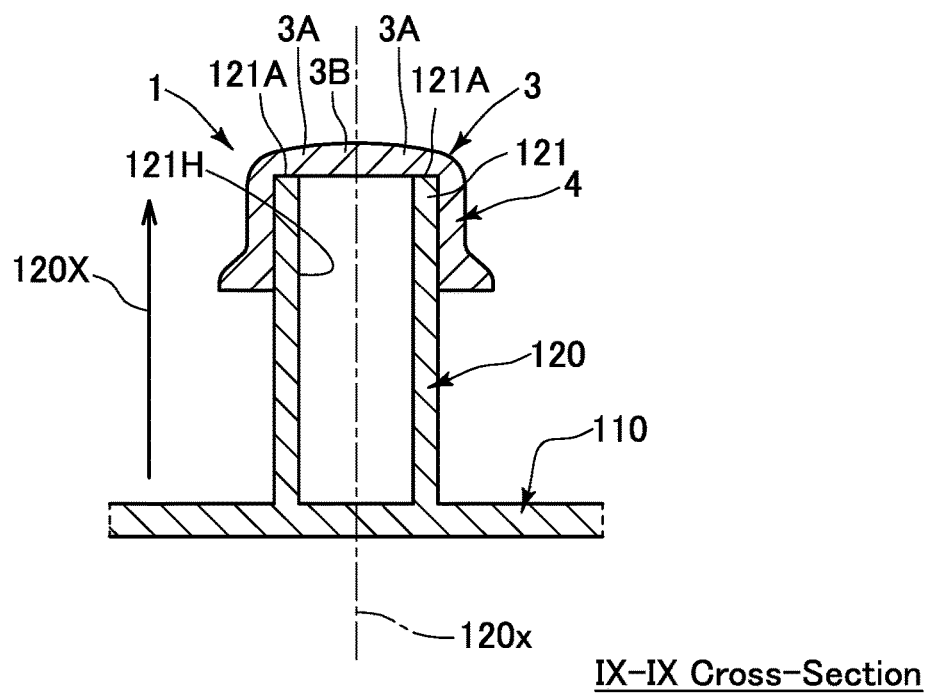
FIG. 9 is a cross-sectional view taken along a line IX-IX in FIG. 8.
Figure 10:
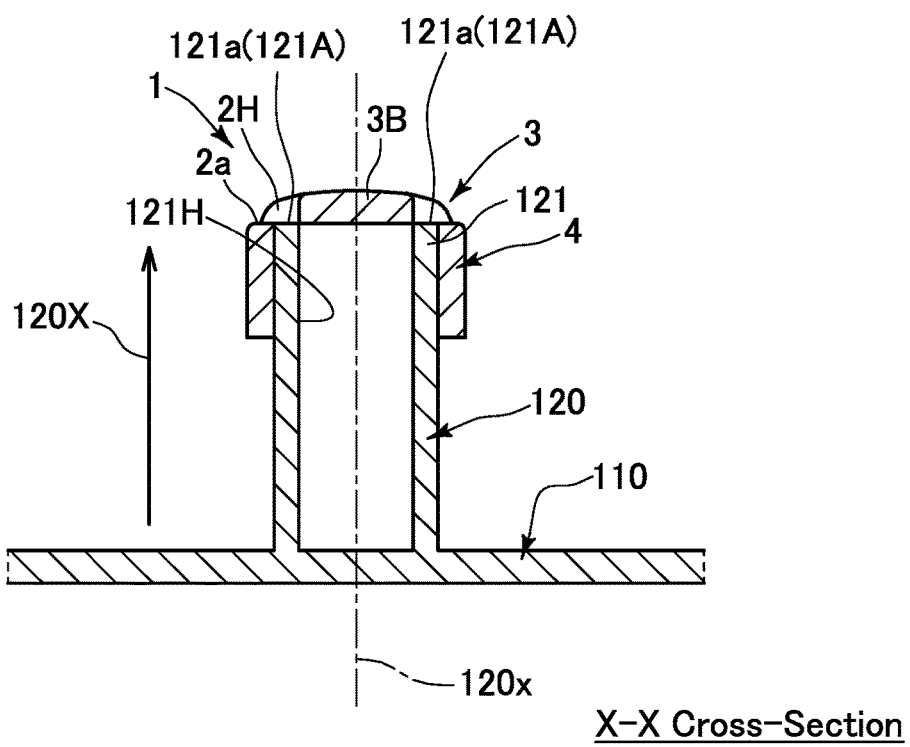
FIG. 10 is a cross-sectional view taken along a line X-X in FIG. 8.

As shown in FIG. 2, the projecting portion 120 projects toward a projecting distal end side from a proximal end side located on a body (plate-like portion) 110 of the door trim 101. The vehicle cushion component 1 is assembled to the distal end 121 of the projecting portion 120 in a direction opposite to a projecting direction 120X of the projecting portion 120. The projecting portion 120 of this embodiment is a bottomed tubular (in this embodiment, bottomed cylindrical) boss (see FIGS. 8 to 10).

Figure 3:
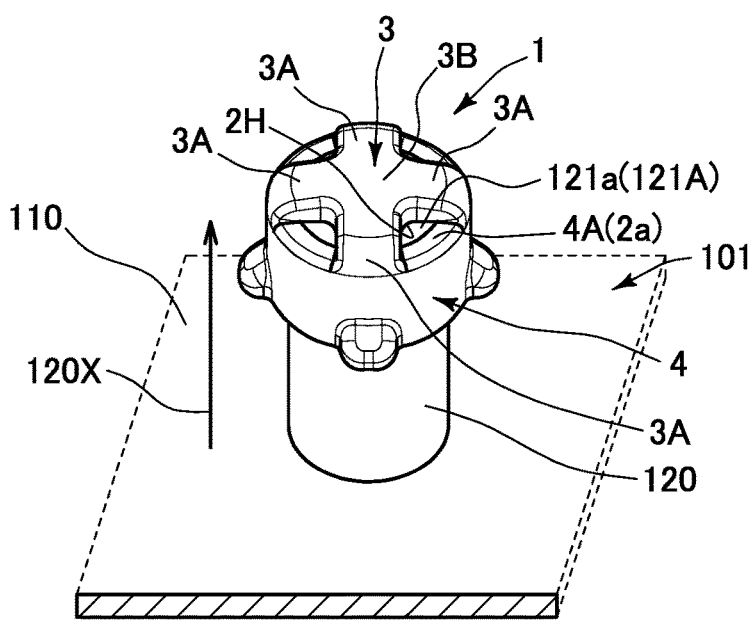
FIG. 3 is a perspective view showing a state after the vehicle cushion component shown in FIG. 2 has been mounted.

As shown in FIG. 3, the vehicle cushion component 1 overlies the projecting distal end 121 (see FIG. 2) side of the projecting portion 120. That is, the vehicle cushion component 1 is an elastic component that can be mounted as a cap to the distal end 121 of the projecting portion 120 projecting from the door trim 101. Accordingly, the vehicle cushion component 1 serving as an elastic component is interposed between the distal end 121 of the projecting portion 120 of the door trim 101 and the opposing member 102 so as be in contact therewith, thus making it possible to prevent generation of unusual sound.

The vehicle cushion component 1 includes: an opening 2H (see FIG. 10) for exposing a portion 121$a$ of the projecting distal end surface 121A of the projecting portion 120, when the vehicle cushion component 1 is assembled to the projecting portion 120 to a predetermined position in a direction opposite to the projecting direction 120X of the projecting portion 120; top extending portions 3A, 3A as an opening outer peripheral portion surrounding the opening 2H; and a positioning surface 2$a$ that constitutes a part of an annular end surface 4A as the opening outer peripheral portion surrounding the opening 2H, the detail of which will be described later, and is adjacent to the portion 121$a$ of the projecting distal end surface 121A of the projecting portion 120 so as to be flush (coplanar) therewith. The provision of the opening 2H makes it possible to look inside the opening 2H when the vehicle cushion component 1 is assembled to the projecting portion 120, thereby visually checking how far the projecting portion 120 is inserted. The provision of the positioning surface 2$a$ makes it possible to determine whether the vehicle cushion component 1 has been assembled normally, based on the visual determination of whether the positioning surface 2$a$ and the portion 121$a$ of the distal end surface 121A of the projecting portion 120 are flush with each other. Furthermore, the mutually adjacent positional relationship between the positioning surface 2$a$ and the portion 121$a$ of the distal end surface 121A of the projecting portion 120 further facilitates the visual determination of whether they are flush with each other.

The vehicle cushion component 1 of this embodiment has a cap shape in which the tubular outer peripheral portion 4 on the projecting distal end 121 side of the tubular projecting portion 120 of the door trim 101 and a contact portion 3 located so as to overlie a distal end opening 121H (see FIG. 2) of the tubular projecting portion 120 and serving as a portion coming into contact with the opposing member 102 are integrated with each other. The opening 2H is formed in the contact portion 3.

Figure 4:
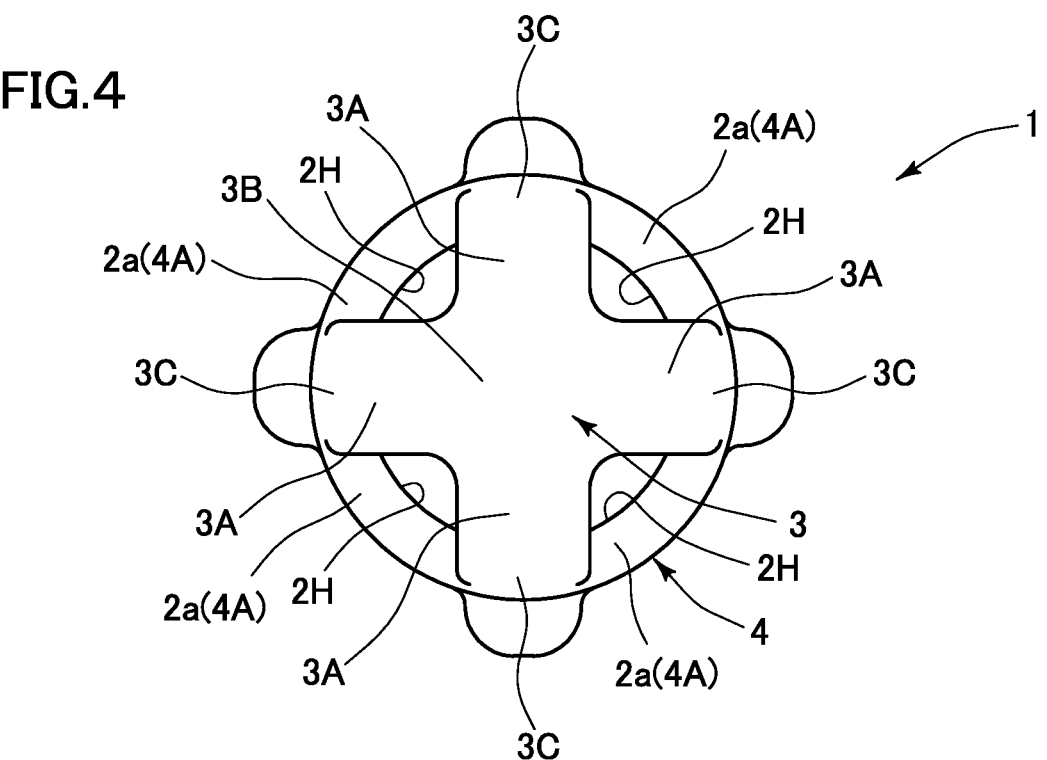
FIG. 4 is a plan view of the vehicle cushion component shown in FIG. 2.
Figure 5:
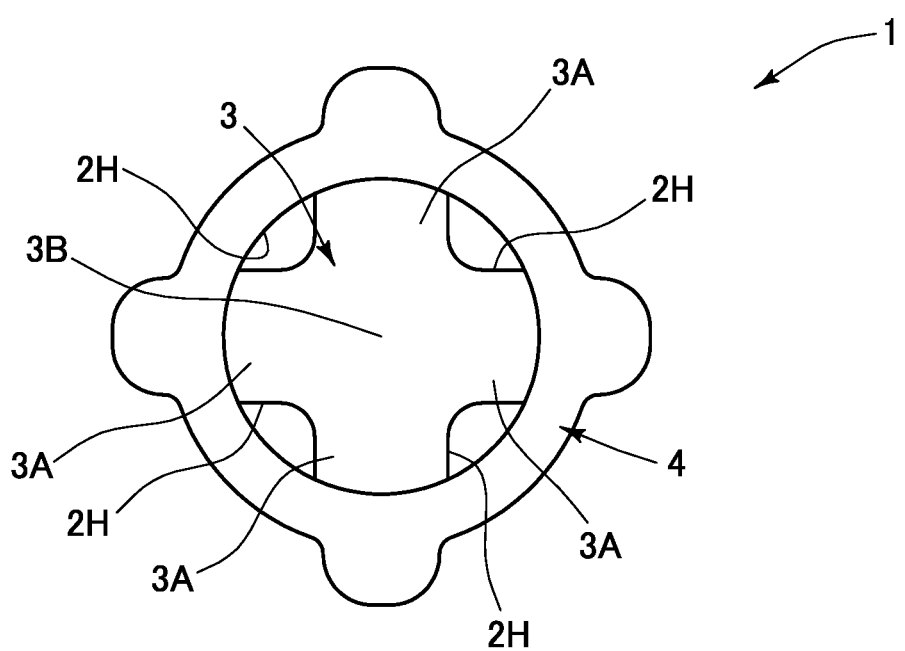
FIG. 5 is a bottom view of the vehicle cushion component shown in FIG. 2.

As shown in FIG. 4, the contact portion 3 is formed of top extending portions 3A that extend inwardly from a plurality of circumferential locations on the annular end surface 4A on the contact portion 3 side of the tubular outer peripheral portion 4, and pass over the distal end opening 121H of the tubular projecting portion 120 of the door trim 101. The top extending portions 3A are connected with each other above the central portion of the distal end opening 121H of the projecting portion 120, and the connected portion forms a top portion 3B coming into contact with the opposing member 102. The top extending portions 3A form a curved shape in which the top extending portions 3A are located further away from the distal end opening 121H toward the central portion side (the top portion 3B side) of the distal end opening 121H (see FIG. 6). That is, the contact portion 3 is formed in a dorm shape, and can smoothly come into contact with the opposing member 102 at the central portion (top portion 3B) of the dorm shape. The central portion (top portion 3B) also has a shape that can easily undergo elastic deformation so as to move closer to the distal end opening 121H side of the projecting portion 120, and therefore reliably absorb vibrations and the like, contributing to prevention of generation of unusual sound.

The opening 2H is formed between the top extending portions 3A, 3A that are adjacent to each other in the circumferential direction around the top portion 3B (i.e., the circumferential direction around the axis 120$x$ (see FIG. 9) of the tubular outer peripheral portion 4) as a through hole for allowing the distal end surface 121A of the tubular projecting portion 120 to be exposed to the outside, without being covered. The opening (through hole) 2H functions as an air hole for allowing the air inside the component 1 to escape when the vehicle cushion component 1 is assembled to the projecting portion 120. Accordingly, the cushion component 1 can be easily assembled to the projecting portion 120 to a predetermined position.

As shown in FIGS. 4 to 7, the top extending portions 3A are formed at equal intervals so as to extend from a plurality of locations (in this example, four locations) on the annular end surface 4A on the contact portion 3 side of the tubular outer peripheral portion 4 toward the top portion 3B. Then, the opening 2H is formed so as to be interposed between the top extending portions 3A, 3A that are adjacent to each other. Furthermore, the opening 2H is surrounded by the top extending portions 3A, 3A that are adjacent to each other so as to be connected at the top portion 3B, and by the annular end surface 4A interposed between outer peripheral end portions 3C, 3C located on a side opposite to the top portion 3B side of the top extending portions 3A, 3A. That is, the top extending portions 3A, 3A and the annular end surface 4A form an opening outer peripheral portion that surrounds the opening 2H. Here, the annular end surface 4A interposed between the outer peripheral end portions 3C, 3C is the positioning surface 2a described above.

Figure 6:
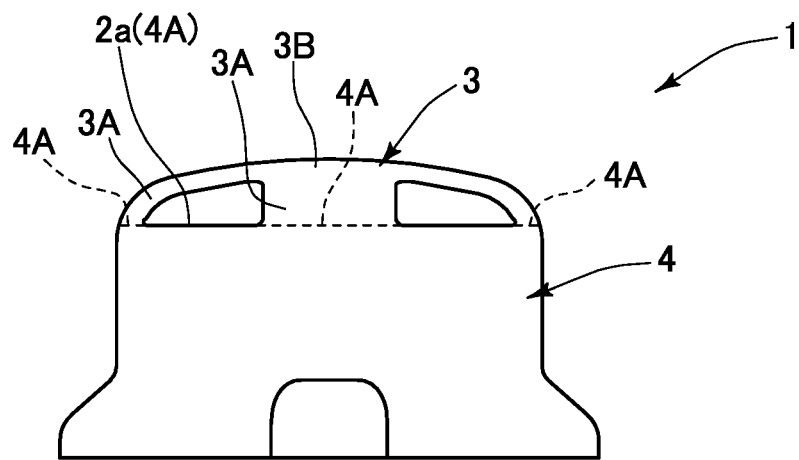
FIG. 6 is a front view of the vehicle cushion component shown in FIG. 2.
Figure 7:
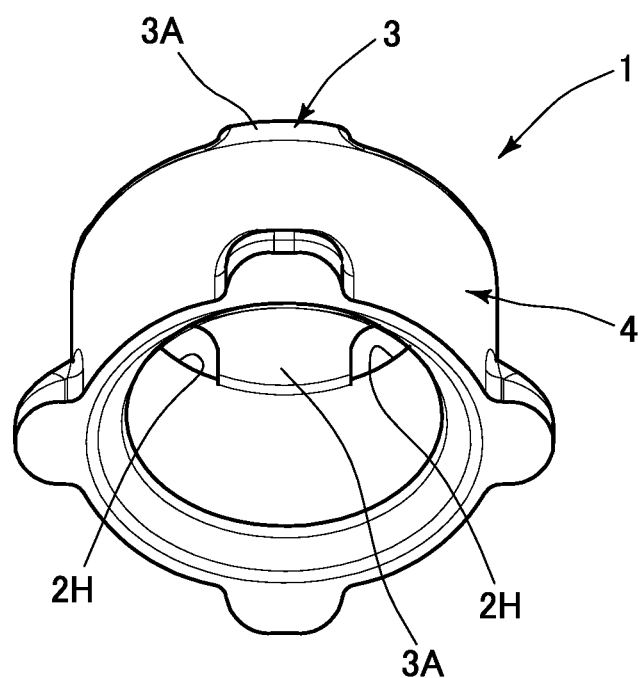
FIG. 7 is a perspective view of the vehicle cushion component shown in FIG. 2.

Although FIG. 6 is a front view of the vehicle cushion component 1, a rear view and left and right side views thereof appear the same as the front view.

Although an embodiment of this invention has been described above, the embodiment is merely illustrative. This invention is not limited to the embodiment, and various modifications such as additions and omissions may be made based on the knowledge of a person skilled in the art without departing from the scope of the claims.

Embodiments different from the above-described embodiment, and modifications will be described below. It should be noted that portions having the same functions as those in the above-described embodiment are designated by the same reference characters and the detailed description thereof is omitted. In addition, the above-described embodiment and the following modifications and other embodiments may be combined to be implemented as appropriate as long as no technical contradiction arises.

In the above-described embodiment, a door trim is used as the interior component 101, and a door inner panel is used as the opposing member 102. However, these may be other components. The interior component 101 may be any component so long as it is a plate-like component that is disposed so as to be exposed to a cabin interior during opening or closing of the door, and the opposing member 102 disposed opposing the interior component 101 on the vehicle exterior side thereof with a space therebetween is provided. For example, the interior component 101 may be a scuff plate, a package tray, a pillar garnish, a back door garnish, a deck side trim, or the like. The opposing member 102 may be any member that is disposed opposing the interior component 101 on the vehicle exterior side thereof with a space therebetween.

In the above-described embodiment, the vehicle cushion component 1 is assembled to the tubular projecting portion 120 of the door trim 101. However, the projecting portion 120 may have another shape, and the vehicle cushion component 1 may be formed accordingly.

Figure 11:
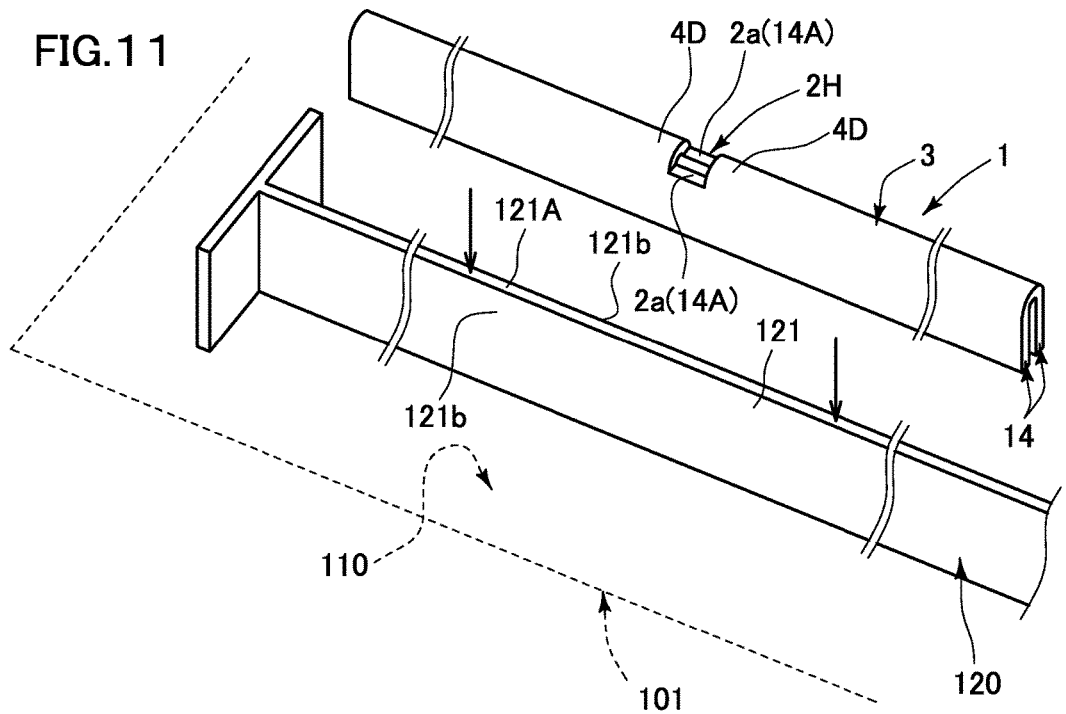
FIG. 11 is a perspective view of a vehicle cushion component according to a second embodiment of this invention, showing a state before the vehicle cushion component is mounted.
Figure 12:
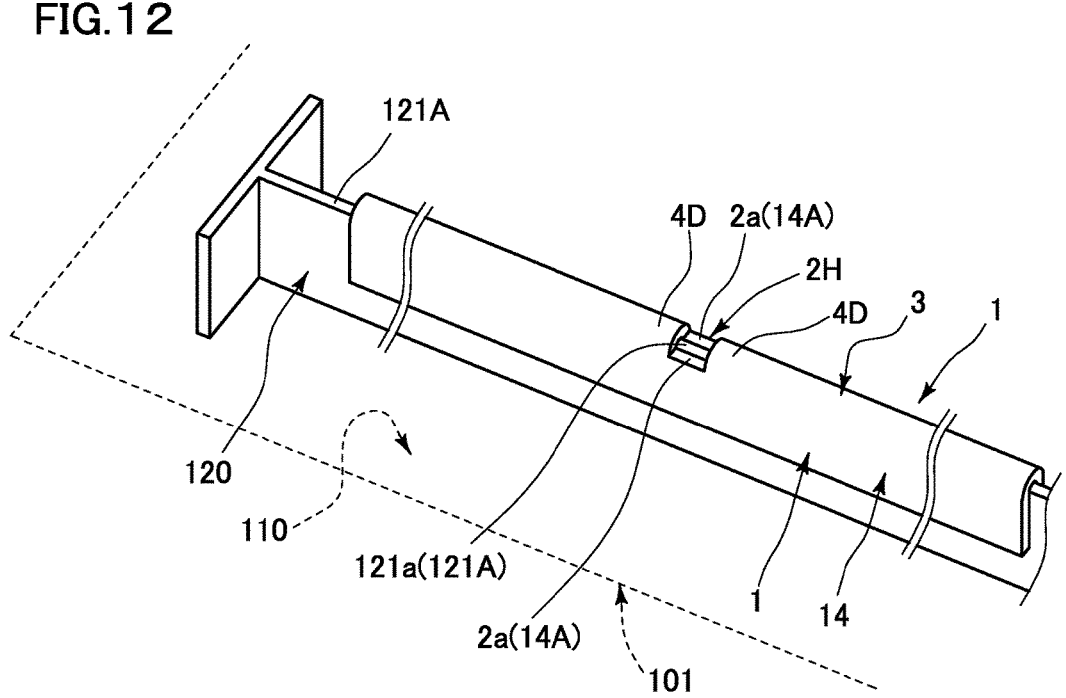
FIG. 12 is a perspective view showing a state after the vehicle cushion component shown in FIG. 11 has been mounted.
Figure 13:
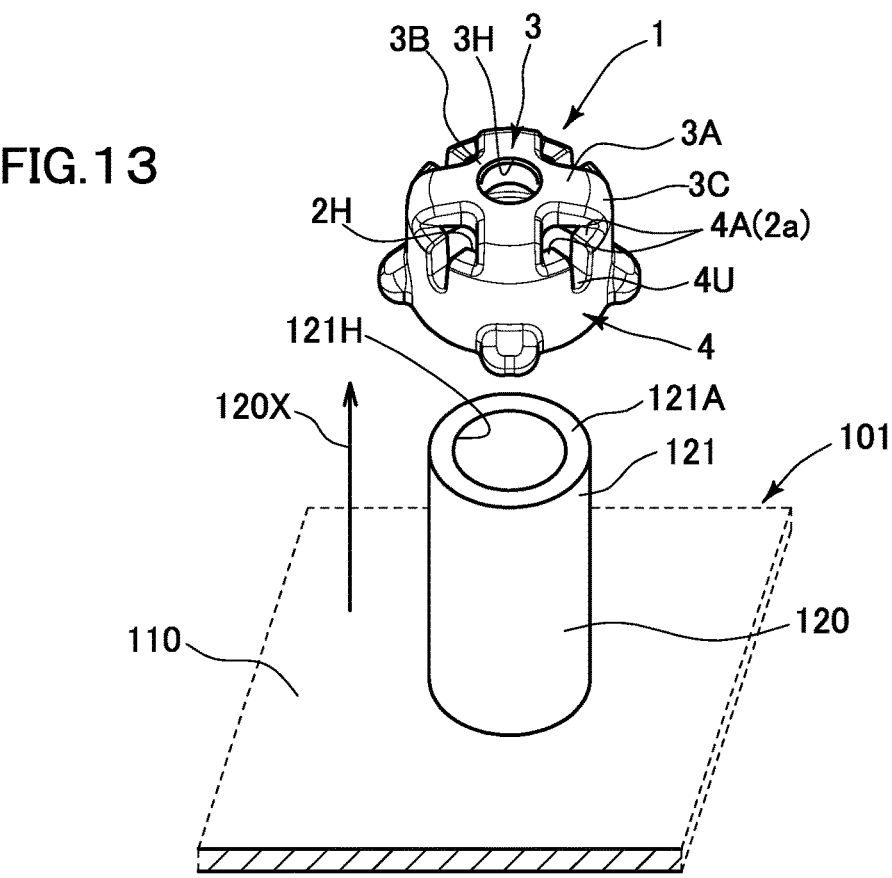
FIG. 13 is a perspective view of a vehicle cushion component according to a third embodiment of this invention, showing a state before the vehicle cushion component is mounted.
Figure 14:
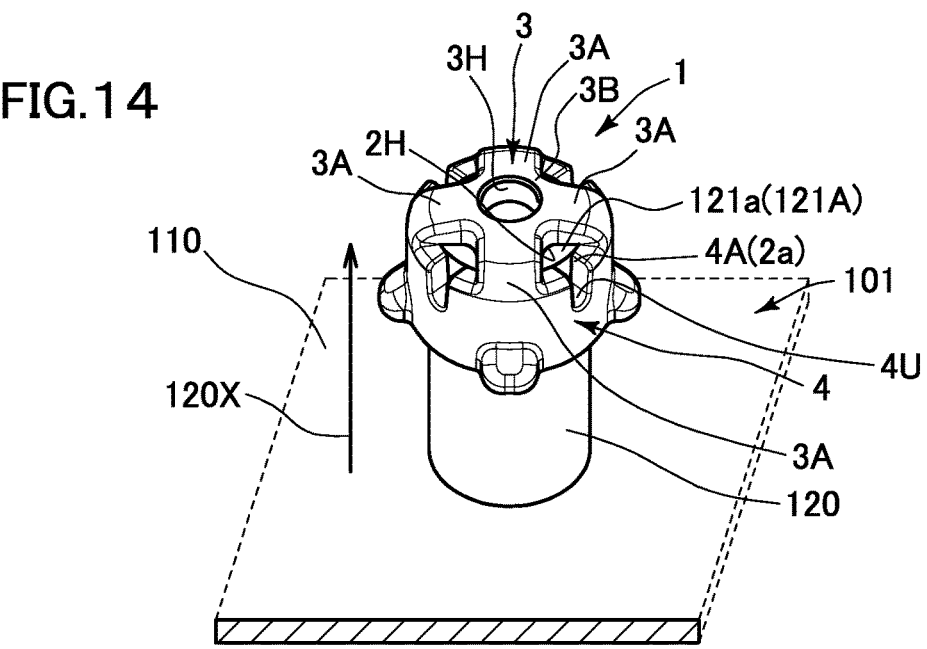
FIG. 14 is a perspective view showing a state after the vehicle cushion component shown in FIG. 13 has been mounted.
Figure 15:
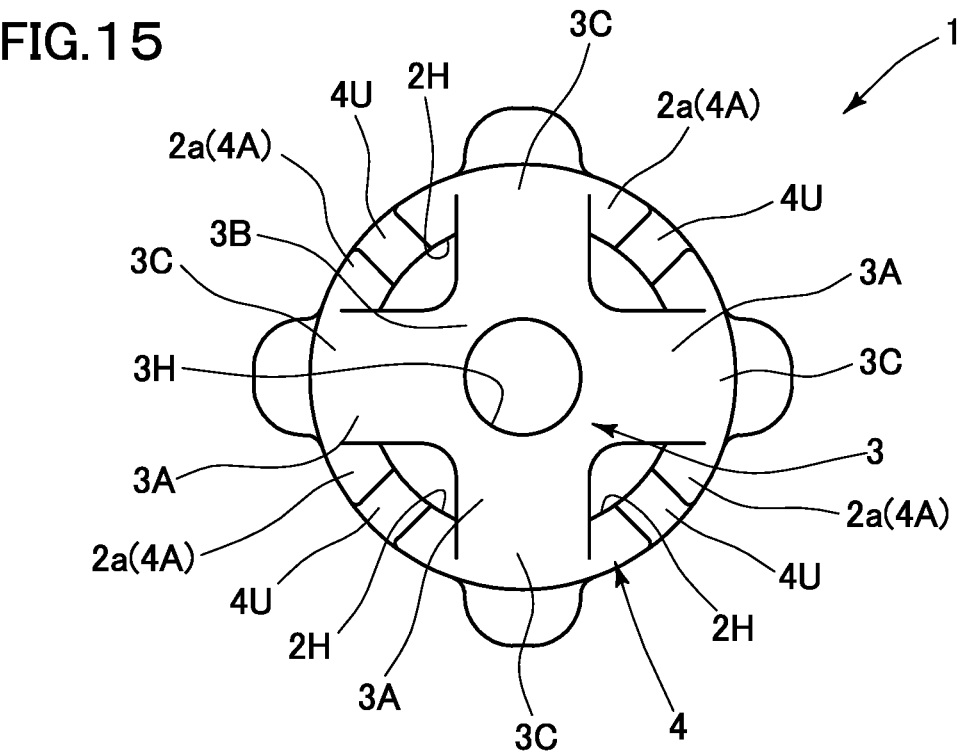
FIG. 15 is a plan view of the vehicle cushion component shown in FIG. 13.
Figure 16:
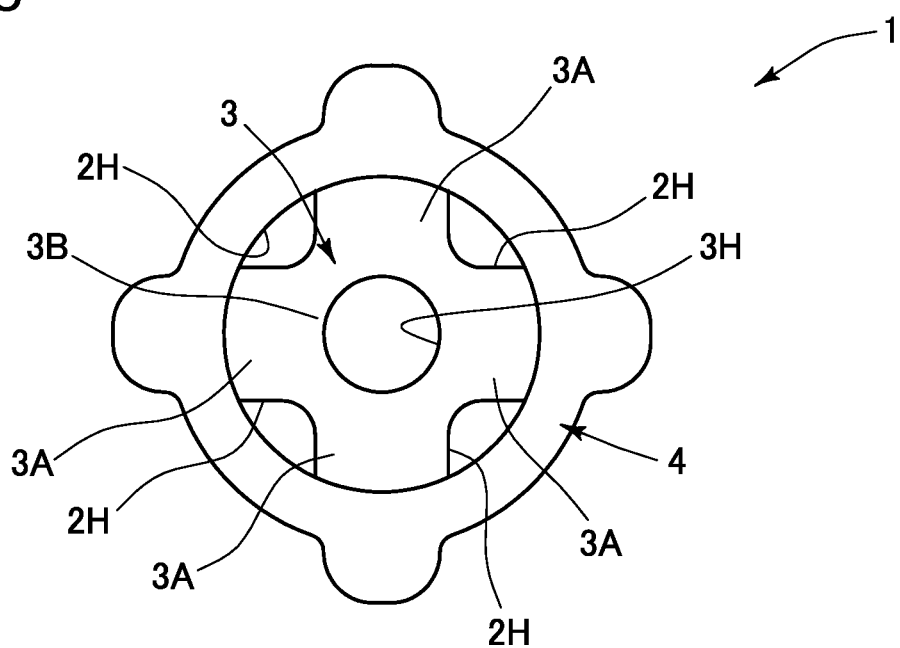
FIG. 16 is a bottom view of the vehicle cushion component shown in FIG. 13.
Figure 17:
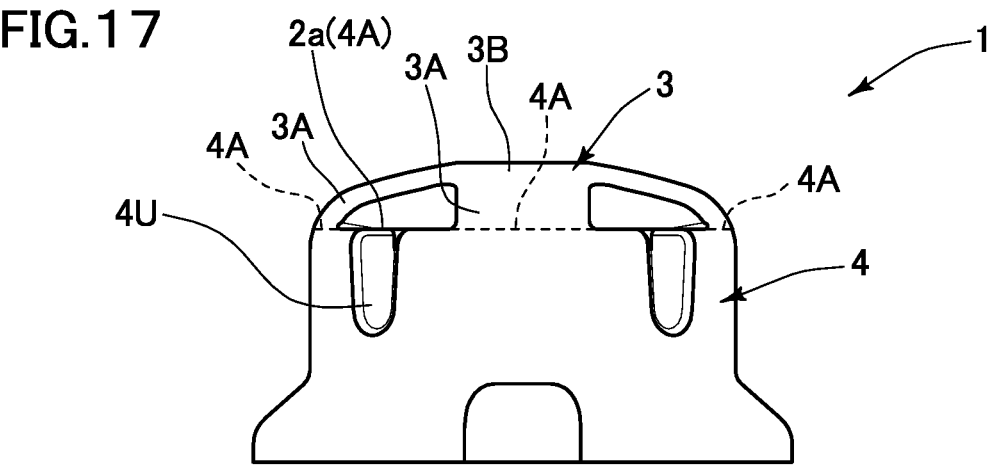
FIG. 17 is a front view of the vehicle cushion component shown in FIG. 13.
Figure 18:
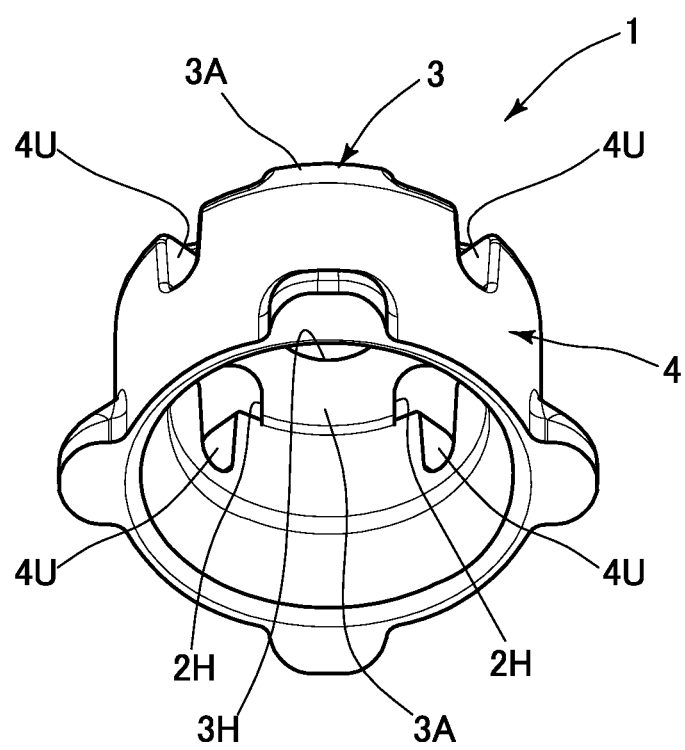
FIG. 18 is a perspective view of the vehicle cushion component shown in FIG. 13.
Figure 19:
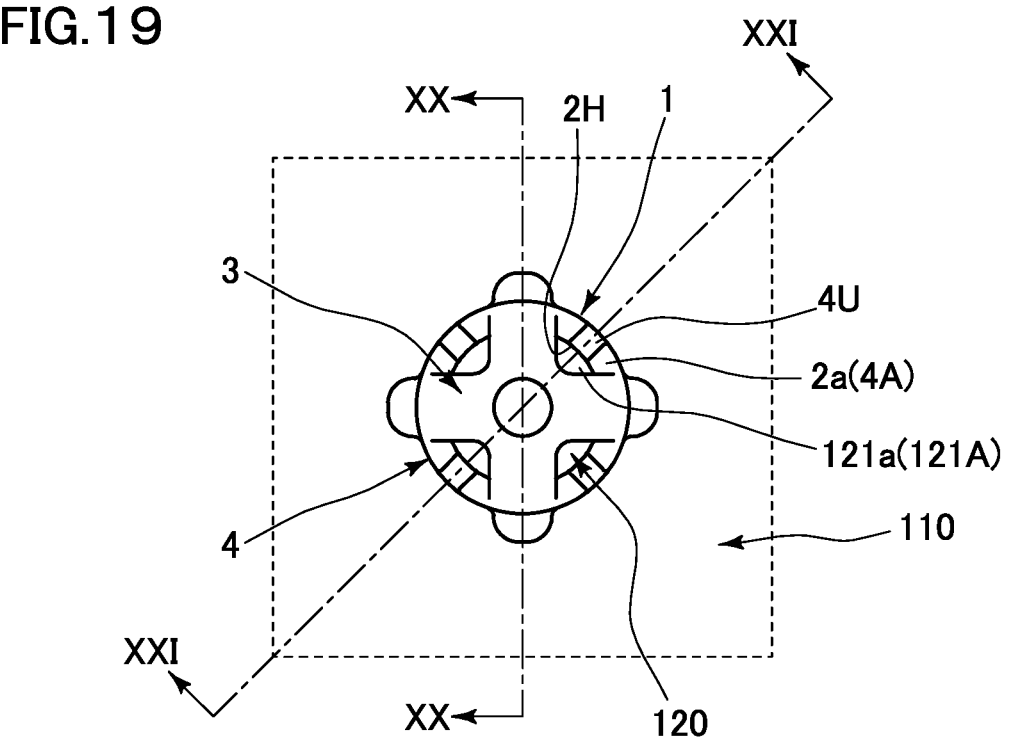
FIG. 19 is a plan view of FIG. 14.

For example, when the projecting portion 120 has a plate-like shape as shown in FIGS. 11 and 12, the vehicle cushion component 1 has a U-shape in which a contact portion 3 located so as to overlie the projecting distal end 121 side of the plate-like projecting portion 120 and serving as a portion coming into contact with the opposing member 102, and a pair of opposing portions 14, 14 (see FIG. 11) located so as to sandwich both front and back principal surfaces 121b, 121b of the projecting distal end 121 are integrated with each other. Also, the opening 2H is formed so as to cut out the contact portion 3. Specifically, as shown in FIG. 12, the contact portion 3 forms a connecting portion that is curved so as to connect the pair of opposing portions 14, 14 on the projecting distal end 121 side of the plate-like projecting portion 120, and is cut out through the plate-like projecting portion 120 in the plate thickness direction on the projecting distal end 121 side. The opening 2H that is formed as the cut-out portion allows a portion 121a of the projecting distal end surface 121A of the projecting portion 120 sandwiched between the pair of opposing portions 14, 14 to be exposed.

Note that the opening outer peripheral portion surrounding the opening 2H is formed of the distal end surfaces 14A, 14A on the contact portion 3 side of the pair of opposing portions 14, 14 exposed by formation of the opening 2H constituting the cut-out portion, and opposing end portions 4D, 4D with the opening 2H of the contact portion 3 interposed therebetween. In this embodiment, when the vehicle cushion component 1 is assembled to the projecting portion 120 to a predetermined position, the portion 121a of the projecting distal end surface 121A of the projecting portion 120 is exposed from the opening 2H, and the portion 121a and the distal end surfaces 14A, 14A on the contact portion 3 side of the opposing portions 14, 14 are adjacent so as to be flush (coplanar) with each other, as shown in FIG. 12. Accordingly, the distal end surfaces 14A, 14A function as the same positioning surfaces 2a, 2a as those in the embodiment described above.

As shown in FIGS. 13 to 21, in the vehicle cushion component 1 of the above-described embodiment, the tubular outer peripheral portion 4 may be provided with cut-out portions 4U that penetrate between the inside and the outside thereof so as to lead to the opening 2H. This makes it possible to more easily determine whether the positioning surface 2a and the portion 121a of the distal end surface 121A of the projecting portion 120 are flush with each other by looking at the cut-out portions 4U from the side. Each of the cut-out portions 4U in this example is formed so as to be cut out downwardly on a portion of the annular end surface 4A of the tubular outer peripheral portion 4 that is located between the outer peripheral end portions 3C, 3C adjacent around the outer periphery of the contact portion 3.

As shown in FIGS. 13 to 21, the vehicle cushion component 1 of the above-described embodiment may be provided with a through hole 3H vertically penetrating through the top portion 3B of the contact portion 3. The through hole 3H functions, together with the opening 2H, as an air hole for allowing the air inside the vehicle cushion component 1 to escape to the outside when the component 1 is assembled to the projecting portion 120.

By the provision of hollow portions such as the cut-out portion 4U and the through hole 3H as described above, the vehicle cushion component 1 as a whole can more easily undergo elastic deformation. This further facilitates the assembly to the projecting portion 120. Since the vehicle cushion component 1 has a shape that can easily undergo elastic deformation, the material therefor can be changed to a more rigid material.

Figure 22:
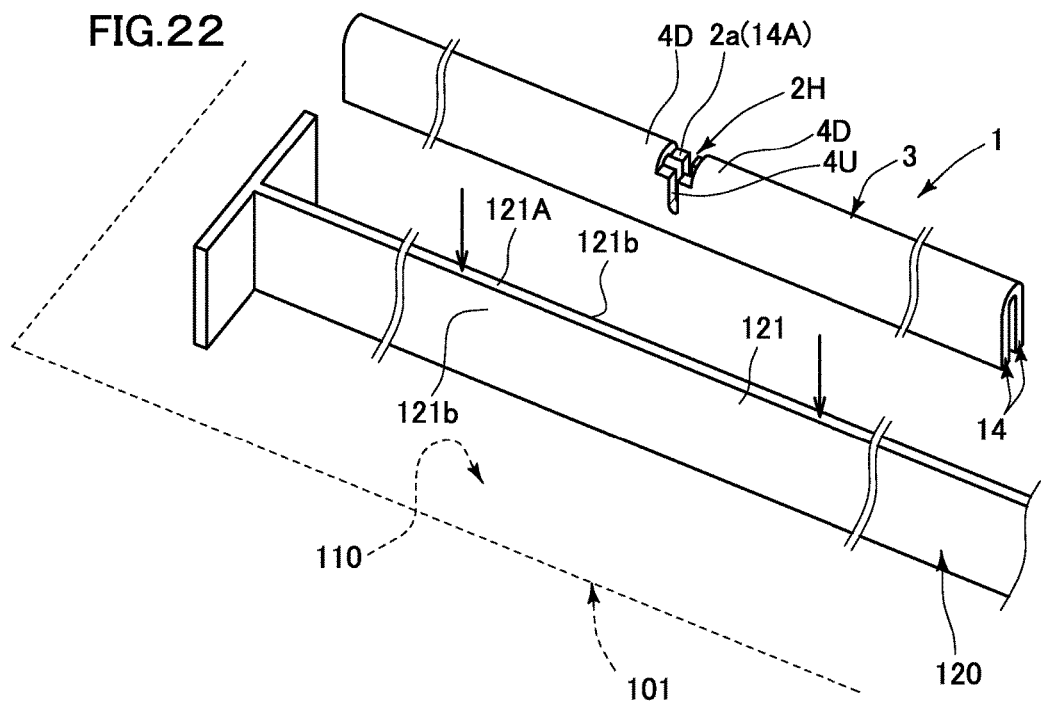
FIG. 22 is a perspective view of a vehicle cushion component according to a fourth embodiment of this invention, showing a state before the vehicle cushion component is mounted.
Figure 23:
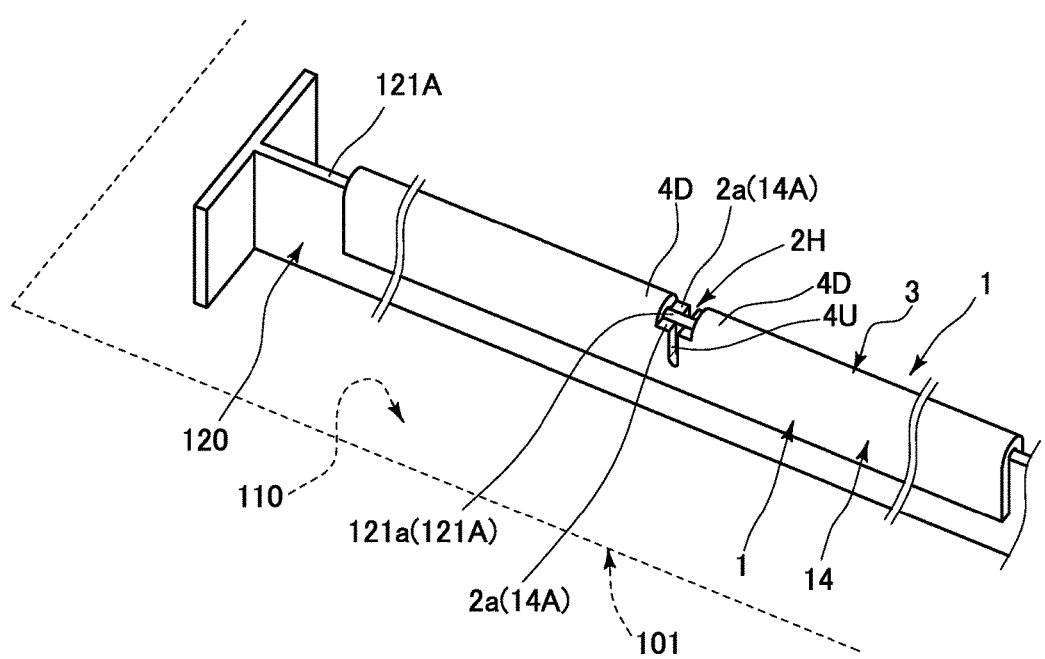
FIG. 23 is a perspective view showing a state after the vehicle cushion component shown in FIG. 22 has been mounted.

The cut-out portion 4U is also applicable to a vehicle cushion component 1 that overlies the distal end 121 of the plate-like projecting portion 120 as shown in FIG. 11. That is, the vehicle cushion component 1 shown in FIG. 11 has a U-shape in which the contact portion 3 and the opposing portions 14, 14 are integrated with each other, and has the opening 2H so as to cutout the contact portion 3. The opposing portions 14, 14 can form a cut-out portion 4U leading to the opening 2H in a section in which the opening 2H is formed in the longitudinal direction, as shown in FIGS. 22 and 23, for example. In this case as well, the positional relationship (i.e., a height difference) between the positioning surface 2a and the portion 121a of the distal end surface 121A of the projecting portion 120 can be directly visually recognized by looking at the cut-out portion 4U from the side, thus further facilitating the determination of whether they are flush with each other. The cut-out portion 4U in this example is formed so as to be cut out downwardly at an intermediate position of the section in which the opening 2H is formed.

DESCRIPTION OF THE REFERENCE CHARACTERS 1 vehicle cushion component
100 vehicle door 101 door trim (interior component)
102 door inner panel (opposing member)
120 projecting portion

What is claimed is:

1. A vehicle cushion component that is disposed as a separate elastic component fitted and assembled to a distal end of a projecting portion formed so as to project from an interior component covering a cabin interior side of a vehicle, toward an opposing member disposed opposing the interior component on a vehicle exterior side thereof so as to maintain a space between the interior component and the opposing member, the vehicle cushion component comprising:
   an opening configured to expose a part of a projecting distal end surface of the projecting portion when the vehicle cushion component is assembled to the projecting portion to a predetermined position, the opening being positioned to make it possible for an installer to look through the opening when the vehicle cushion component is assembled to the projecting portion, thereby visually determining how far the projecting portion is inserted; and
   a positioning surface that constitutes a part of an opening outer peripheral portion surrounding the opening and is adjacent to the projecting distal end surface so as to be coplanar therewith, wherein a provision of the positioning surface makes it possible to determine whether the vehicle cushion component has been assembled normally, based on the visual determination through the opening of whether the positioning surface and the portion of the distal end surface of the projecting portion are flush with each other.

2. The vehicle cushion component according to claim 1, wherein
   the vehicle cushion component has a cap shape in which a contact portion and a tubular outer peripheral portion are integrated with each other, the contact portion being located so as to overlie a distal end opening of the projecting portion and coming into contact with the opposing member when the vehicle cushion component is assembled to the projecting portion with a tubular shape to a predetermined position, and the tubular outer peripheral portion surrounding an outer periphery of a projecting distal end side of the projecting portion, and
   the opening is formed in the contact portion.

3. The vehicle cushion component according to claim 2, wherein
   the contact portion is formed of a plurality of top extending portions that extend from a plurality of circumferential locations on an annular end surface of the tubular outer peripheral portion on the contact portion side, and are connected with each other above a central portion of the distal end opening, inwardly so as to pass over the distal end opening of the tubular projecting portion, and each of the top extending portions has a curved shape so as to be located further away from the distal end opening toward a central portion of the distal end opening.

4. The vehicle cushion component according to claim 1, wherein
   the vehicle cushion component has a U-shape in which a contact portion and a pair of opposing portions are integrated with each other, the contact portion being located so as to overlie a projecting distal end side of the projecting portion with a plate shape and coming into contact with the opposing member, and the pair of opposing portions being located so as to sandwich both front and back principal surfaces on the projecting distal end side, and
   the opening is formed so as to cut out the contact portion.

5. The vehicle cushion component according to claim 1, wherein
   the opening is also configured to allow the air inside the component to escape when the vehicle cushion component is assembled to the projecting portion.

* * * * *